(12) United States Patent
Dasgupta et al.

(10) Patent No.: US 10,103,970 B2
(45) Date of Patent: *Oct. 16, 2018

(54) USING STATISTICAL AND HISTORICAL INFORMATION OF TOPOLOGY METRICS IN CONSTRAINED NETWORKS

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,397

(22) Filed: May 4, 2016

(65) Prior Publication Data

US 2016/0248661 A1    Aug. 25, 2016

Related U.S. Application Data

(63) Continuation of application No. 13/947,268, filed on Jul. 22, 2013, now Pat. No. 9,356,875.

(51) Int. Cl.
*H04L 12/721* (2013.01)
*H04L 12/851* (2013.01)
(Continued)

(52) U.S. Cl.
CPC ........ *H04L 45/123* (2013.01); *H04L 41/5019* (2013.01); *H04L 43/16* (2013.01); *H04L 45/308* (2013.01); *H04L 45/48* (2013.01); *H04L 47/24* (2013.01); *H04W 40/14* (2013.01); *H04W 40/248* (2013.01); *H04L 45/14* (2013.01); *Y02D 70/00* (2018.01); *Y02D 70/142* (2018.01);
(Continued)

(58) Field of Classification Search
None
See application file for complete search history.

(56) References Cited

U.S. PATENT DOCUMENTS 6,032,194 A * 2/2000 Gai ................... H04L 12/462
340/2.1
6,526,044 B1 * 2/2003 Cookmeyer, II ...... H04L 41/142
370/352
(Continued)

OTHER PUBLICATIONS

Sefcheck, et al., "Office Action issued in U.S. Appl. No. 13/947,268, filed Jul. 22, 2013", dated Oct. 8, 2015, 1-14.

*Primary Examiner* — Gregory B Sefcheck
(74) *Attorney, Agent, or Firm* — Johnson, Marcou & Isaacs, LLC

(57) ABSTRACT

Statistical and historical values of performance metrics are actively used to influence routing decisions for optimum topologies in a constrained network. Traffic service level is constantly monitored and compared with a service level agreement. If deviation exists between the monitored traffic service level and the terms of the service level agreement, stability metrics are used to maintain paths through the network that meet the terms of the traffic service level agreement or that improve the traffic flow through the network. Backup parent selection for a node in the network is performed based on previous performance of backup parents for the node.

31 Claims, 6 Drawing Sheets

(51) Int. Cl.
  *H04W 40/14* (2009.01)
  *H04W 40/24* (2009.01)
  *H04L 12/725* (2013.01)
  *H04L 12/753* (2013.01)
  *H04L 12/24* (2006.01)
  *H04L 12/26* (2006.01)

(52) U.S. Cl.
  CPC .......... *Y02D 70/144* (2018.01); *Y02D 70/22* (2018.01); *Y02D 70/34* (2018.01)

(56) References Cited

U.S. PATENT DOCUMENTS

| | | | |
|---|---|---|---|
| 6,633,544 B1 | 10/2003 | Rexford et al. | |
| 6,804,912 B2 * | 10/2004 | van Weel | A01G 7/00 47/58.1 R |
| 6,826,165 B1 * | 11/2004 | Meier | G06F 1/1626 370/256 |
| 7,185,077 B1 * | 2/2007 | O'Toole | H04L 12/185 370/254 |
| 7,415,548 B2 * | 8/2008 | Mahany | G06F 15/0225 370/329 |
| 7,457,646 B2 * | 11/2008 | Mahany | G06F 1/1626 370/311 |
| 7,483,397 B2 * | 1/2009 | Meier | G06F 1/1626 370/256 |
| 7,552,246 B2 * | 6/2009 | Mahany | G06F 1/1626 370/329 |
| 7,899,951 B2 * | 3/2011 | Mahany | G06F 15/0225 370/329 |
| 7,917,145 B2 * | 3/2011 | Mahany | H04L 45/18 455/435.1 |
| 7,984,137 B2 * | 7/2011 | O'Toole, Jr. | H04L 12/185 370/256 |
| 8,037,517 B2 | 10/2011 | Fulp et al. | |
| 8,051,164 B2 | 11/2011 | De Peuter et al. | |
| 8,270,313 B2 | 9/2012 | Tao et al. | |
| 8,301,755 B2 | 10/2012 | De Peuter et al. | |
| 8,468,504 B2 | 6/2013 | Hassan et al. | |
| 8,489,765 B2 | 7/2013 | Vasseur et al. | |
| 8,520,691 B2 * | 8/2013 | daCosta | H04W 8/005 370/408 |
| 8,588,108 B2 | 11/2013 | Vasseur et al. | |
| 8,630,177 B2 | 1/2014 | Vasseur et al. | |
| 8,631,101 B2 * | 1/2014 | Shaffer | H04L 29/12254 709/221 |
| 8,654,649 B2 | 2/2014 | Vasseur et al. | |
| 8,775,352 B2 | 7/2014 | Sen et al. | |
| 8,787,392 B2 * | 7/2014 | Vasseur | H04L 45/028 370/400 |
| 8,855,306 B2 | 10/2014 | Oba et al. | |
| 8,862,774 B2 | 10/2014 | Hui et al. | |
| 8,971,188 B2 | 3/2015 | Vasseur et al. | |
| 8,976,733 B2 * | 3/2015 | daCosta | H04W 84/22 370/328 |
| 8,996,666 B2 | 3/2015 | Vasseur | |
| 9,081,567 B1 | 7/2015 | Mahamuni et al. | |
| 9,356,875 B2 * | 5/2016 | Dasgupta | H04L 47/24 |
| 2004/0153863 A1 * | 8/2004 | Klotz | H04L 41/12 714/45 |
| 2006/0215581 A1 * | 9/2006 | Castagnoli | H04L 43/00 370/254 |
| 2006/0215583 A1 * | 9/2006 | Castagnoli | H04L 45/02 370/254 |
| 2008/0101260 A1 * | 5/2008 | Maruyama | H04L 12/66 370/255 |
| 2012/0155475 A1 * | 6/2012 | Vasseur | H04L 45/028 370/400 |
| 2012/0213124 A1 * | 8/2012 | Vasseur | H04L 41/12 370/255 |
| 2012/0324273 A1 | 12/2012 | Shaffer et al. | |
| 2014/0222729 A1 | 8/2014 | Dasgupta et al. | |
| 2015/0023174 A1 | 1/2015 | Dasgupta et al. | |
| 2015/0085668 A1 | 3/2015 | Parsons et al. | |

\* cited by examiner

USING STATISTICAL AND HISTORICAL INFORMATION OF TOPOLOGY METRICS IN CONSTRAINED NETWORKS

This patent application is a continuation of and claims priority to U.S. patent application Ser. No. 13/947,268 (now U.S. Pat. No. 9,356,875) filed Jul. 22, 2013, and entitled "Using Statistical and Historical Information of Topology Metrics in Constrained Networks." The entire contents of the above-identified application is hereby fully incorporated herein by reference.

TECHNICAL FIELD

Background

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale IP smart object networks pose a number of technical challenges. For instance, the degree of density of such networks (such as Smart Grid networks with a large number of sensors and actuators, smart cities, or advanced metering infrastructure ("AMI") networks) may be extremely high. For example, it is not rare for each node to see several hundreds of neighbors. This architecture is particularly problematic for LLNs, where constrained links can wreak havoc on data transmission.

Applying quality of service (QoS) techniques is thus generally desired to maintain data transmission reliability and control delays in LLNs. However, since the devices themselves are also constrained, the complexity of QoS in such networks can be problematic. That is, a primary challenge lies in the overall complexity of QoS architectures in LLNs. For instance, in conventional networks, policies must be specified for packet coloring and congestion avoidance algorithms must be configured on nodes, in addition to queuing disciplines. These algorithms all generally require a deep knowledge of the traffic pattern, link-layer characteristics, node resources, etc. and comprise a number of parameters to configure on each individual device to effectively provide adequate network-wide QoS.

DESCRIPTION OF EXAMPLE EMBODIMENTS

Overview

Figure 1:
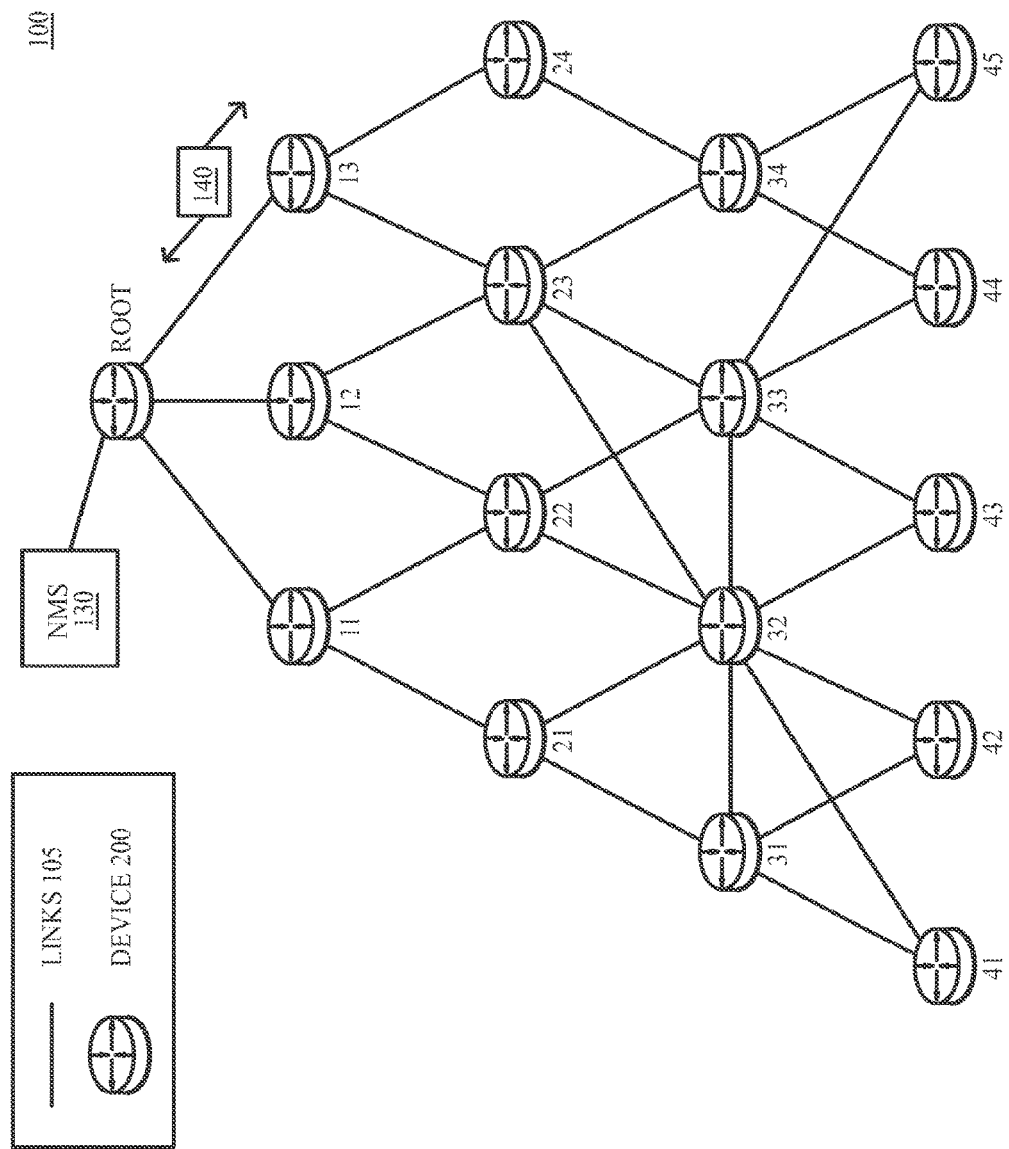
FIG. 1 is a diagram depicting an example communication network in accordance with certain example embodiments.

In a multi-PHY, low power and lossy network (LLN) comprising a plurality of nodes, a rate of change for parents of a node is calculated. The rate of change is a ratio of a number of changes in parent node observed for the node and a total number of observations of the node. A parent preference for the node also is calculated. The parent preference is a proportion of instances in which the node's most frequent parent is observed for the node and a total number of observations of the node. Then, a local next-hop algorithm for the node is overridden by selecting a parent node for the node based on at least one of the calculated rate of change for parents of the node and the calculated parent preference for the node.

Description

Referring to the drawings, in which like numerals represent like (but not necessarily identical) elements throughout the figures, example embodiments are described.

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of any range from a few dozen or up to thousands or even millions of LLN routers and support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network and that the view illustrated herein is for simplicity. Also, those skilled in the art will further understand that while the network is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using pre-defined network communication protocols, such as certain known wired protocols, wireless protocols (for example, IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
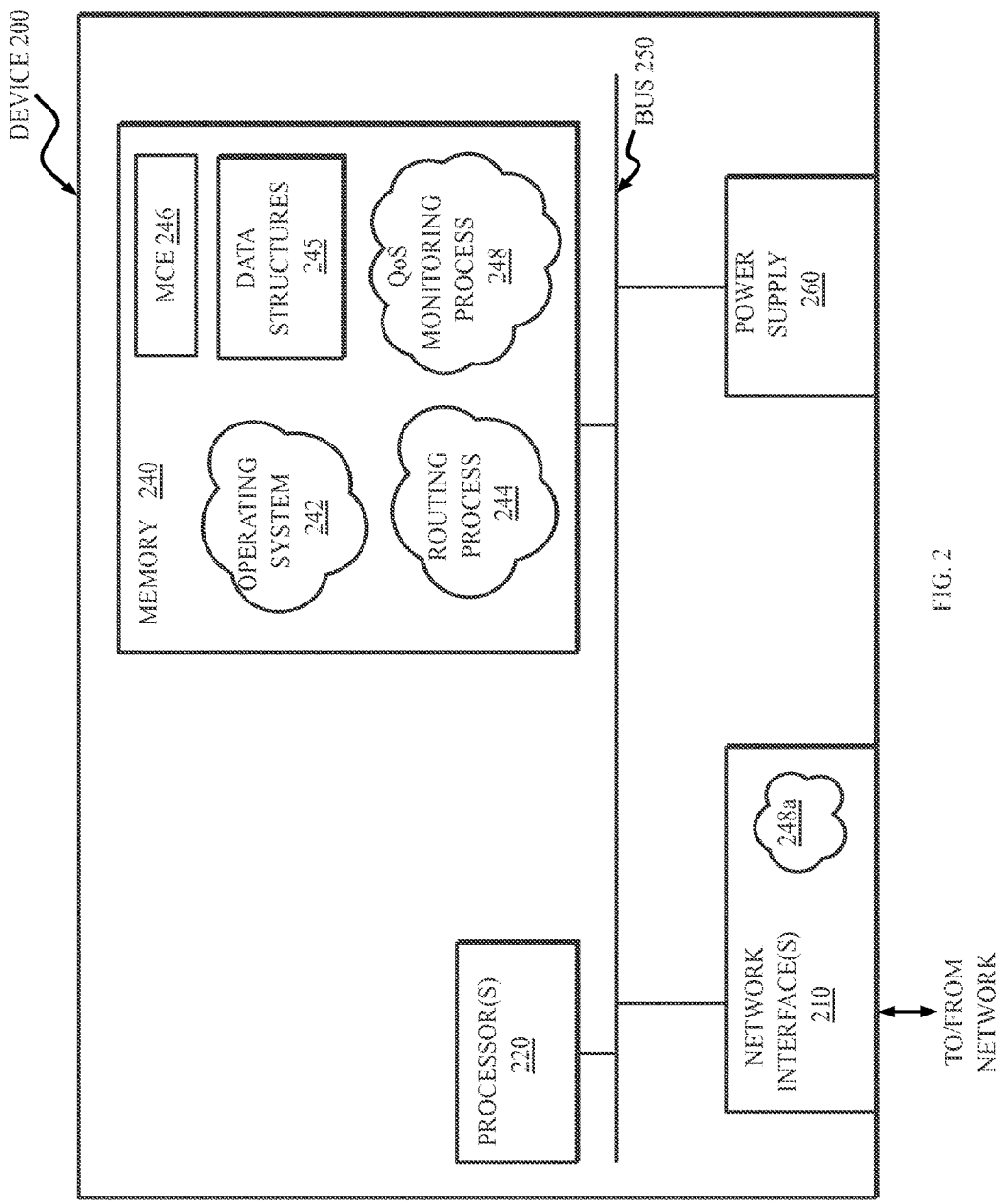
FIG. 2 is a block diagram depicting an example network device/node in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have multiple types of network connections 210, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:
1) Links are generally lossy, such that a Packet Delivery Rate/Ratio (PDR) can dramatically vary due to various sources of interferences, for example, considerably affecting bit error rate (BER);
2) Links are generally low bandwidth, such that control plane traffic must generally be bounded and negligible compared to the low rate data traffic;
3) A number of use cases require specifying a set of link and node metrics, some of them being dynamic, thus requiring specific smoothing functions to avoid routing instability, which considerably drains bandwidth and energy;
4) Constraint-routing may be required by some applications, for example, to establish routing paths that will avoid non-encrypted links, nodes running low on energy, etc.;
5) Scale of the networks may become very large, for example, on the order of several thousands to millions of nodes; and
6) Nodes may be constrained with low memory, a reduced processing capability, a low power supply (for example, battery), etc.

In other words, LLNs are a class of network in which both the routers and their interconnect are constrained: LLN routers typically operate with constraints, for example, processing power, memory, and/or energy (battery), and their interconnects are characterized by, illustratively, high loss rates, low data rates, and/or instability. LLNs are comprised of anything from a few dozen and up to thousands or even millions of LLN routers. Additionally, LLNs support point-to-point traffic (between devices inside the LLN), point-to-multipoint traffic (from a central control point to a subset of devices inside the LLN), and multipoint-to-point traffic (from devices inside the LLN towards a central control point).

An example implementation of LLNs is an "Internet of Things" network. As described above, the term "Internet of Things" or "IoT" may be used by those in the art to refer to uniquely identifiable objects (things) and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (for example, smart grid, smart cities, building and industrial automation, etc.), it has been of the utmost importance to extend the IP protocol suite for these networks.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example objective function (for example, a default objective function) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
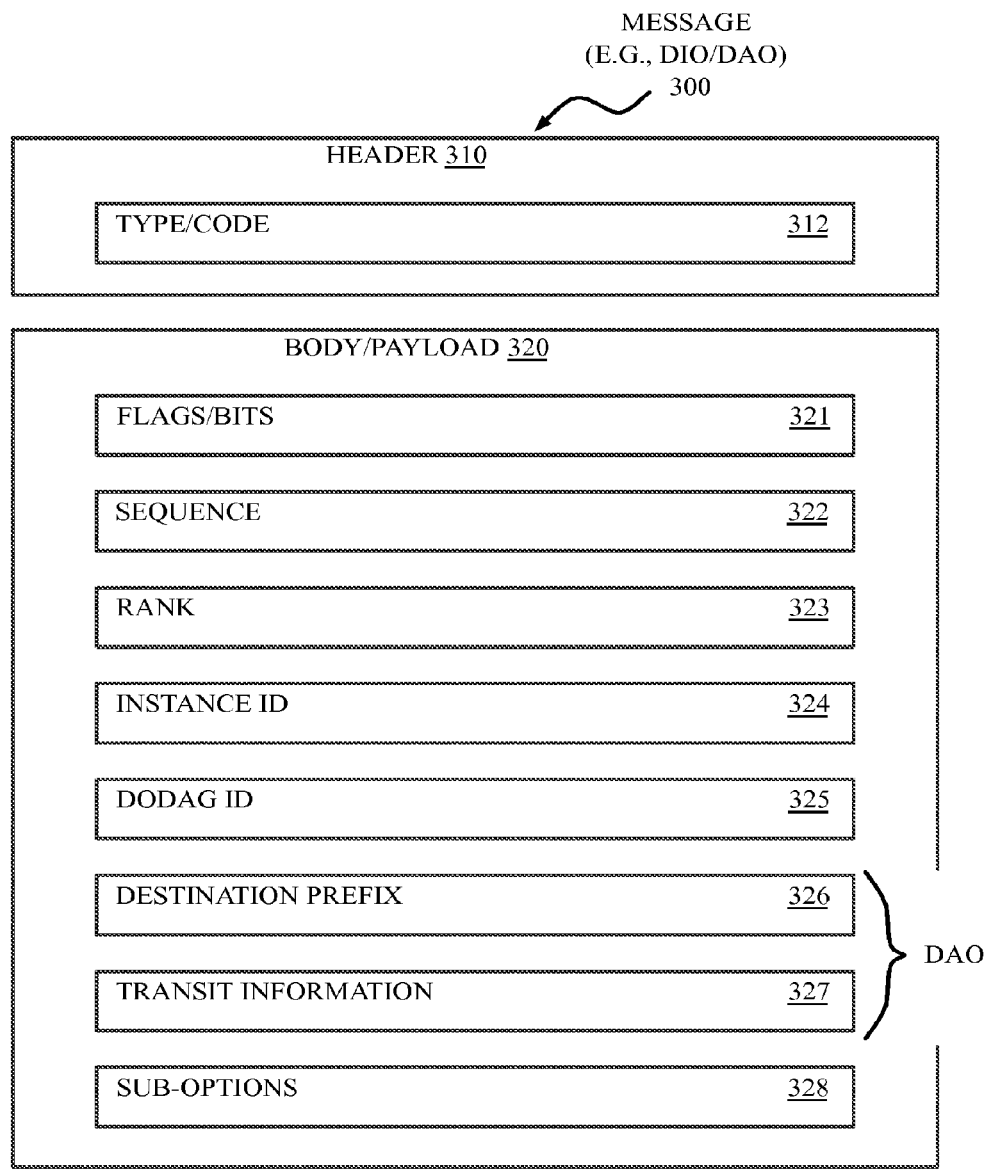
FIG. 3 is a block diagram depicting packet header and payload organization in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO_Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
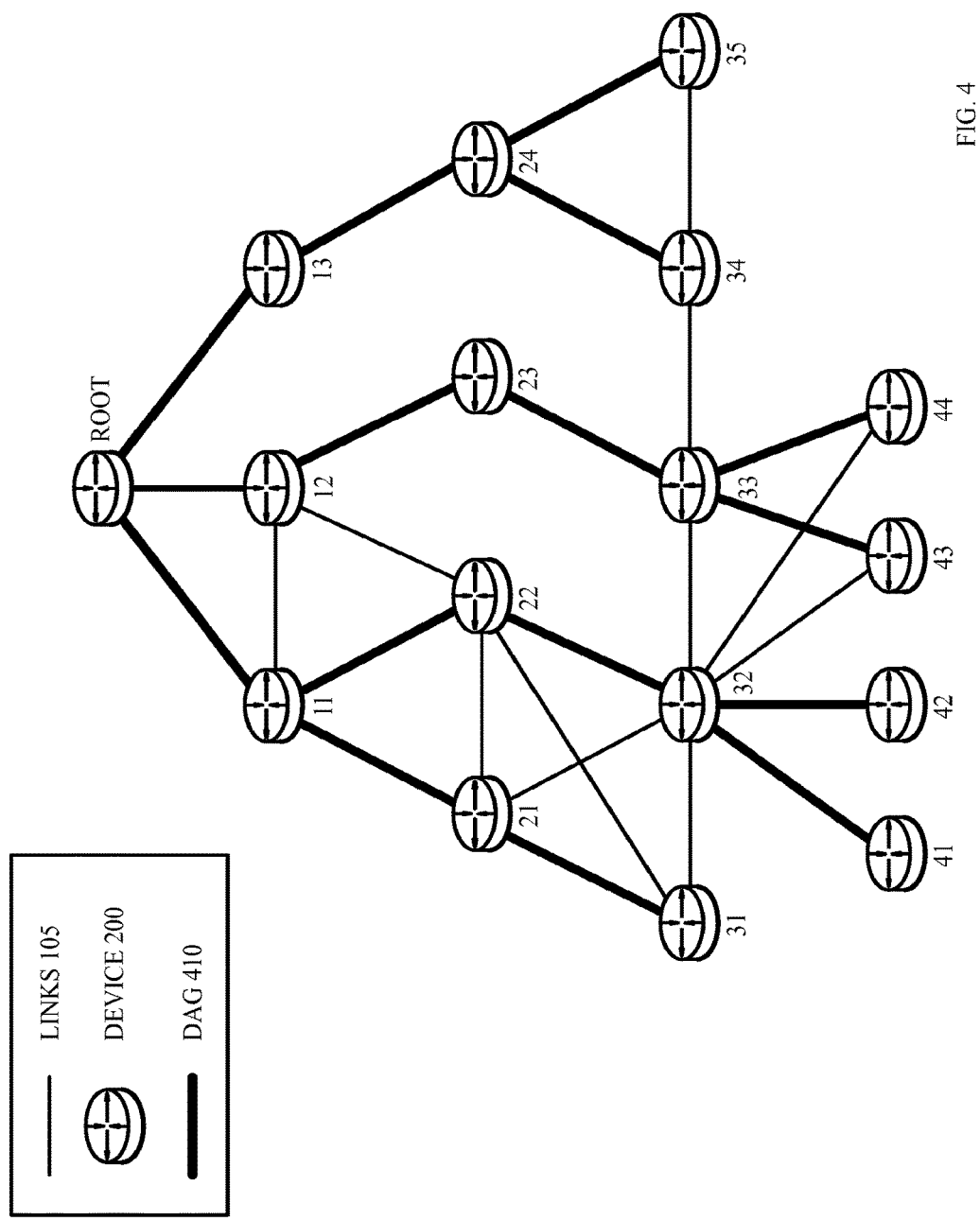
FIG. 4 is a diagram depicting a directed acyclic graph defined within a computer network in accordance with certain exemplary embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC) networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power tines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:
1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few KBits/s, and even lower when crossing transformers (for PLC). Without proper mechanisms, these situations can cause networks to violate critical service level agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+round robin+dynamic priorities), (4) bandwidth reservation (for example, Diffsery (by CoS), Intsery (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, (8) Congestion Avoidance techniques, etc. However, while some of these techniques may apply to LLNs, most are not suitable because they are too costly in terms of bandwidth (control plane overhead), memory (state maintenance), and/or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Using Statistical and Historical Information of Topology Metrics in Constrained Networks According to the techniques described herein, a capable node (for example, a LLN Border Router (LBR)/Root, Field Area Router (FAR), etc.), or nodes, within a constrained network (for example, an LLN) may monitor network traffic and dynamically and proactively identify paths and/or individual nodes that require QoS monitoring to, for example, maintain compliance with an SLA. For instance, the capable node, or nodes, may monitor and correlate parent-hopping history, sets of events, traffic flow patterns, traffic volume, etc. observed in the network to identify node paths or individual nodes within the network that may require an override of a local next hop algorithm to specify a particular parent node for QoS reasons. These QoS monitoring metrics may then be provided to the routing engine for routing topology changes.

Illustratively, the techniques described herein may be performed by hardware, software, and/or firmware, such as in accordance with the "QoS monitoring" process 248/248a shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

Operationally, the techniques herein generally relate to monitoring parent node characteristics of nodes in an LLN, and overriding a local next hop algorithm to specify a parent node and/or backup parent nodes based on the monitored characteristics. In a local next hop algorithm, RPL allows a node to select parents and backup parents with next best link qualities according to routing metrics (for example, expected transmission count (ETX)). This action operates so that when the link quality with regard to specific metrics to the primary parent deteriorates, traffic can be routed (or "hopped") through the next step backup parent. The backup parent, however, can also suffer from similar link quality deterioration causing further oscillations. These oscillations may be mitigated using low-pass filters. Unfortunately, this mitigation impacts the reactiveness of the system leading to slow reactions to the link metric changes. Due to this highly dynamic nature of LLNs, the paths taken by traffic both in the upstream and downstream directions can be dynamic and different. These paths make it difficult to determine the path quality and to predict service levels experienced by traffic originating from and destined to specific nodes. The techniques described herein can specify a parent and/or backup parents for nodes in the network based on monitored node characteristics to help reduce path changes in the network. In this manner, prediction of path quality can be determined more readily for consistent paths in the network.

Embodiments described herein use statistical and historical information of routing behavior performance metrics to dynamically and periodically influence the routing behavior to meet traffic SLAs. Stability metrics introduced herein are used to influence best next hop parent selection such that traffic meets the SLA. Backup parent selection statistics reduce the variability experienced by traffic. A dynamic, global change of the parent and backup parent selection algorithm on each node in the network can also be performed.

In certain example embodiments, statistical and historical values of performance metrics are actively used to influence routing decisions for optimum topologies. Traffic service level is constantly monitored and compared with SLAs. If any deviation exists, stability metrics are used to maintain paths that meet traffic SLAs. Backup parent selection is performed based on previous performance of backup parents. This selection can help to minimize unknown variability experienced by transit traffic during parent changes.

Specifically, two stability metrics are introduced herein to quantify stability in an LLN DAG. The two stability metrics are "flappiness" and "stickiness."

As referred to herein, flappiness is a measure of a rate of change of parents for a node. Flappiness is computed as a ratio of a total number of event observations of a node and a number of changes in parent observed at the node during those event observations. As an example, if a node n was observed five times and it had two parent changes during those five observations, the flappiness of the node is 5/2 or 2.5. In this example, a lower flappiness number indicates a higher instability in the network for the node n because node n is changing parent nodes more often, as compared to a higher flappiness number. Alternatively, a higher flappiness number indicates a higher stability in the network for the node n because node n is changing parent nodes less often, as compared to a lower flappiness number.

In alternative example embodiments, flappiness can be measured as the ratio of the number of parent changes per number of event observations. Sticking with the previous example, in this case, the flappiness would be 2/5 or 0.40. In this example, a higher flappiness number indicates a higher instability in the network for the node n because node n is changing parent nodes more often, as compared to a lower flappiness number. Alternatively, a lower flappiness number indicates a higher stability in the network for the node n because node n is changing parent nodes less often, as compared to a higher flappiness number.

As illustrated by the examples, the flappiness can be measured in different ways, and the thresholds for determining network instability can be established in accordance with the particular method of measurement. Nevertheless, an examination of a total number of observed events and a number of times that the node changes its parent in those observed events can provide an indication of the network's stability or instability.

Stickiness, as referred to herein, is a measure of parent preference of a node. Stickiness is a proportion of observations in which a preferred parent of a node n matches its most frequent parent. As an example, if out of five observations, a node has the same parent in two of them, its stickiness is 5/2 or 2.5. In this example, a higher stickiness number indicates a higher stability in the network for the node n because node n is using the same parent more often, as compared to a lower stickiness number. Alternatively, a lower stickiness number indicates a lower stability in the network for the node n because node n is changing parents more often, as compared to a higher stickiness number. In alternative example embodiments, stickiness can be measured as the ratio of the most frequent parent per number of observations. Sticking with the previous example, in this case, the stickiness would be 2/5 or 0.40.

These metrics do not characterize a link or a node metric but a local routing behavior that could be caused by the nature of the link or nodes, and also the local algorithm, which contrasts with usual routing metrics. In certain example embodiments, the metrics can be computed at the DAG-root by a metric computation module (MCE) 246 once a new DAO is received and read because every DAO carries parent information. The DAG-root learns the behavior of the nodes during a learning period where these metrics are tracked for every node and then adjusts node behavior to control network stability.

In another example embodiment, the metrics can be computed by a node management system (NMS) 130 that monitors and logs the routing topology changes based on Constrained Application Protocol (CoAP) messages. These changes are used to influence the parent selection algorithm of the nodes based on the SLA observed by the traffic. In this case, the MCE 246 that resides on the DAG-root periodically interacts with the NMS 130 to determine whether all types of traffic are meeting their SLA or not. If traffic SLA is not being met, the MCE 246 determines the nodes that should change their parents/backup parents or stick to (in other words, not change) their parents/backup parents for the traffic to meet its SLA.

In certain example embodiments, the stability metrics are used to influence the routing of traffic to meet traffic SLAs. The routing topology metrics are used to override local next-hop selection algorithms at the node level based on the measured SLA and the knowledge of the set of potential parents and backup parents.

Figure 5:
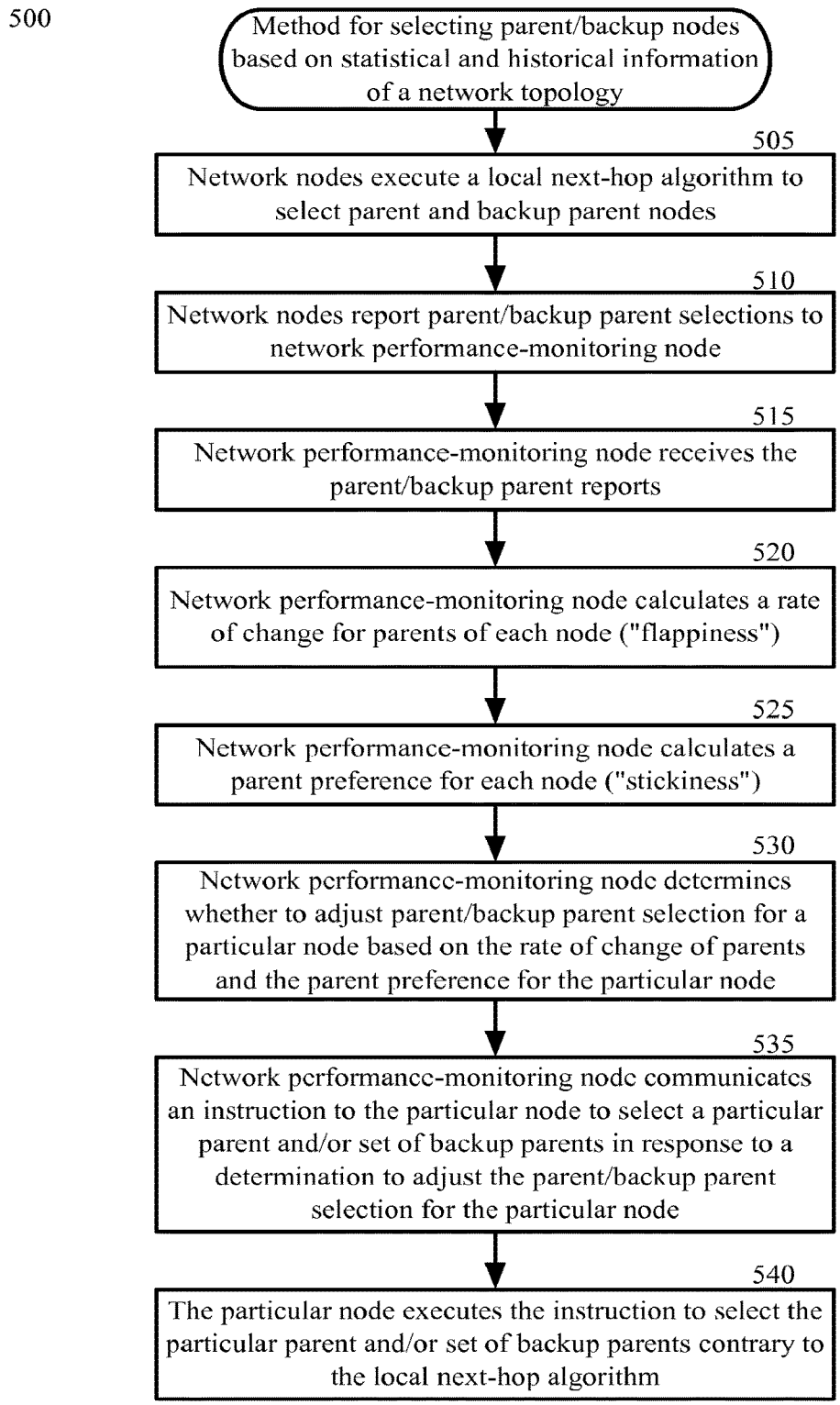
FIG. 5. is a block flow diagram depicting a method for selecting parent nodes based on statistical and historical information of a network topology in accordance with certain example embodiments.

FIG. 5. is a block flow diagram depicting a method 500 for selecting parent/backup parent nodes based on statistical and historical information of a network topology in accordance with certain example embodiments.

In block 505, each node within the network 100 executes a local next—hop algorithm to select its parent and backup parent nodes. For example, each node can continuously monitor its environment to ascertain link quality between surrounding nodes. For instance, a node can monitor transmissions to and from surrounding nodes and can calculate the link quality between its surrounding nodes. The node ranks its surrounding parent nodes based on the calculated link quality, and then selects the first node having the best link quality as its parent node and selects the second and third nodes having the next best link qualities as its first and second backup nodes. The node repeats this process and hops to a new parent node/backup parent nodes as the link quality ranking changes. In certain example embodiments, the parent node/backup parent nodes can be changed each time the link quality ranking changes. Alternatively, the determination to change parent/backup parent nodes can be reduced based on additional factors. Although described herein as being based on a ranking of link quality, the node selection can be based on any suitable determination of link quality between surrounding nodes.

In block 510, each node in the network reports its parent and backup parent selections to a node capable of monitoring network performance, such as the root node, an LLN Border Router, and/or the NMS 130. For example, each time a node changes its parent or backup parents, the node communicates a DAO message to the network performance-monitoring node. The DAO message indicates that the node has changed its parent and/or backup nodes and its current parent and backup nodes. In this manner, each node continually updates the network performance-monitoring node of its parent and backup parent nodes.

In block 515, the network performance-monitoring node receives the parent/backup parent reports from the network nodes, and, in blocks 520 and 525, the network performance-monitoring node calculates performance metrics for the network nodes based on the information in the reports.

More specifically, in block 520, the network performance-monitoring node calculates a rate of change for parents for each node based on the reporting information for each node. In example embodiments, the rate of change of parent nodes for a particular node can be calculated as the "flappiness" factor as a ratio of a number of changes in parent node to a number of observations, as described previously herein.

In block 525, the network performance-monitoring node calculates a parent preference for each node based on the reporting information for each node. In example embodiments, the parent preference for a particular node can be calculated as the "stickiness" factor as a ratio of a number of times a preferred parent is observed to a number of observations, as described previously herein.

In block 530, the network performance-monitoring node determines whether to adjust parent/backup parent selection for a particular node based on the rate of change of parents and the parent preference for the particular node.

In example embodiments, the network performance-monitoring node can continuously calculate the performance metrics for all nodes in the network and can compare those performance metrics to service level agreement requirements to detci mine whether to implement a change in network path or network performance. The calculated performance metrics also can be assessed based on network instability levels to determine whether to implement a change in network path or network performance.

For example, the network performance-monitoring node may determine that increased network stability is desired to improve network performance and/or to allow network performance to be determined on a more consistent basis. In this high-stability mode, the network performance-monitoring node may determine that certain nodes have too much flappiness and should be instructed to stick to their corresponding preferred parent node. The degree of flappiness that may trigger the instruction to stick to the preferred parent node is configurable based on a desired stability level for the network. For example, if nodes having a relatively low flappiness still result in meeting current service level agreements, then a change to the local next-hop algorithm is not needed. However, if the network is not meeting service level agreements or other specified performance metrics, then the network performance-monitoring node can identify nodes with a relatively high degree of flappiness to instruct those nodes to stick to their corresponding preferred parents. Additionally, the preferred parent for a particular node can be identified based on the calculated parent preference (stickiness) for the node.

In the high-stability mode, nodes can be instructed to select the stickiest parents. This action increases network stability by preventing those nodes from hopping to another parent. By instructing nodes to stick to their preferred parents, stability in the network can be increased because the nodes are not hopping between parents and traffic follows a consistent path. Additionally, child nodes are more stable because they suffer less performance deterioration since their parent nodes are not hopping. This stability can allow the network performance-monitoring node to calculate consistent performance metrics for the network. This action also helps to cause traffic traversing those nodes to experience jitter that will be constant and within known bounds, where jitter is the introduction of random delay by a node to the retransmission of a received packet. In certain cases, even if a particular parent provided the best path for network transmission, it may be beneficial to override the local behavior and choose a more stable parent to avoid jitter, for example.

Similarly, in a low-latency mode, the network performance-monitoring node desires to minimize transmission delay. If the network is not meeting transmission service levels, the network performance-monitoring node can determine that network paths must change to increase network performance. Accordingly, the network performance-monitoring node can determine that certain nodes should not flap but rather should stick with parent nodes that result in the least transmission delay. In certain example embodiments, if two parents of a node have a similar or the same transmission delay, then the specified parent may be the "stickiest" parent, in other words, the more preferred parent of the node.

In another example embodiment, backup parent selection can be influenced to increase network stability and performance. In this regard, the network performance-monitoring node continually monitors backup parent selection for nodes based on the received reports. Additionally, the network performance-monitoring node can monitor performance for specific nodes based on the received reports. Accordingly, the network performance-monitoring node obtains historical information about the quality of backup parents for a particular node. If the network performance-monitoring node determines that a backup parent for a particular node is not typically used as a backup node or that the backup node has poor performance characteristics, then the network performance-monitoring node can determine to instruct the node not to use that backup node. For example, the network performance-monitoring node may instruct a node not to use a particular node as a backup node but rather to use the most second and third, etc. most sticky parents as backup parent nodes. In this manner, backup parents having known characteristics can be selected for a particular node.

"Churn" is a rate of attrition of devices moving out of communication with a node. Churn can occur, for example, when a node keeps selecting backup parents that suffer from highly variable link quality, which increases flappiness and causes node oscillations between parents and backup parents. Since the network performance-monitoring node is monitoring and logging all the information as DAO messages are received, every node can be observed for its variability in backup parents and its most common and stable backup parents. Based on how closely the traffic service level is to a required service level, statistical and historical information of backup parents is used to influence backup selection of the nodes carrying that traffic. In this manner, even when nodes change their parents, the selected backup parents will not create excessive deviation in the service level experienced by the traffic. This method can reduce churn in a network implementing the techniques described herein.

In certain other example embodiments, the network performance-monitoring node may determine that flappiness with the network is too high compared to a configured level or threshold of network flappiness. The threshold can be applied to individual nodes or in the aggregate to multiple nodes. If desired to increase network stability by decreasing node flappiness, then the network performance-monitoring node can determine to instruct particular nodes to use a use parent nodes specified by the network performance-monitoring node. In this example, stickiness may or may not be a factor in determining which parent node the network performance-monitoring node identifies as the specified parent node. For example, the network performance-monitoring node may instruct a particular node to use a specified parent node based on the network performance-monitoring node determination that the specified parent node is the best node to meet desired network performance.

Referring back to FIG. 5, in block 535, the network performance-monitoring node communicates instructions to particular nodes to select particular parents and/or backup parents in response to a determination from block 530 to adjust the parent/backup parent selection for the particular nodes. For example, the network performance-monitoring node may communicate a routing control plane message to a particular node to instruct the particular node to implement the desired parent/backup parent selection, as determined in block 530 based on the metrics calculated in blocks 520 and 525. In this regard, the control plane message instructs the particular node to disregard its local next-hop algorithm and to select the parent/backup parents specified in the control plane message.

Then, in block 540, the instructed nodes receive and execute the instruction to select the particular parent and/or set of backup parents contrary to the local next-hop algorithm executing at each node. In this manner, an override of the local next-hop algorithm is performed by the node selecting its parent node based on at least one of the measured rate of change for parents of the node and the measured parent preference of the node, as instructed by the network performance-monitoring node.

In one example embodiment, the override may be permanent for a node until the node receives an instruction to return to execution of the local next-hop algorithm or until the node receives a new instruction to select another parent/backup parent. In another example embodiment, the instruction provided in block 535 can be specify a period of time during which the override is in effect for the node (for example, for a period of time of X seconds or minutes or other suitable unit of time). At the expiration of the specified time, the node returns to executing the local next-hop algorithm.

The steps described with regard to the method 500 of FIG. 5 can be performed continuously, repeatedly, and simultaneously to continue to select parent/backup nodes based on statistical and historical information of the network topology.

In certain example embodiments, a global override is instructed for the best next-hop selection used by the nodes in the network. When nodes experience a high degree of flappiness, it may be beneficial to dynamically adapt the parent selection algorithm for the nodes. In this case, a new best next-hop selection algorithm can be instructed in a newly defined message carried within a routing protocol, such as a DIO message in RPL.

As described, the techniques disclosed herein can perform a routing override based on information that can be ascertained globally, instead of letting the nodes rely on their local decisions for the next parent selection.

While there have been shown and described illustrative embodiments that provide use of statistical and historical information of topology metrics for stable topologies and improved QoS, it is to be understood that various other adaptations and modifications may be made within the spirit and scope of the example embodiments described herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used.

Although the network performance monitoring node is described herein as a root node or LBR, the techniques described herein can be performed by any capable node being suitably programmed and comprising suitable architecture to execute the techniques described herein. For example, the node other than a root node or an LBR can perform the techniques described herein either on behalf of itself or other nodes in the network.

Figure 6:
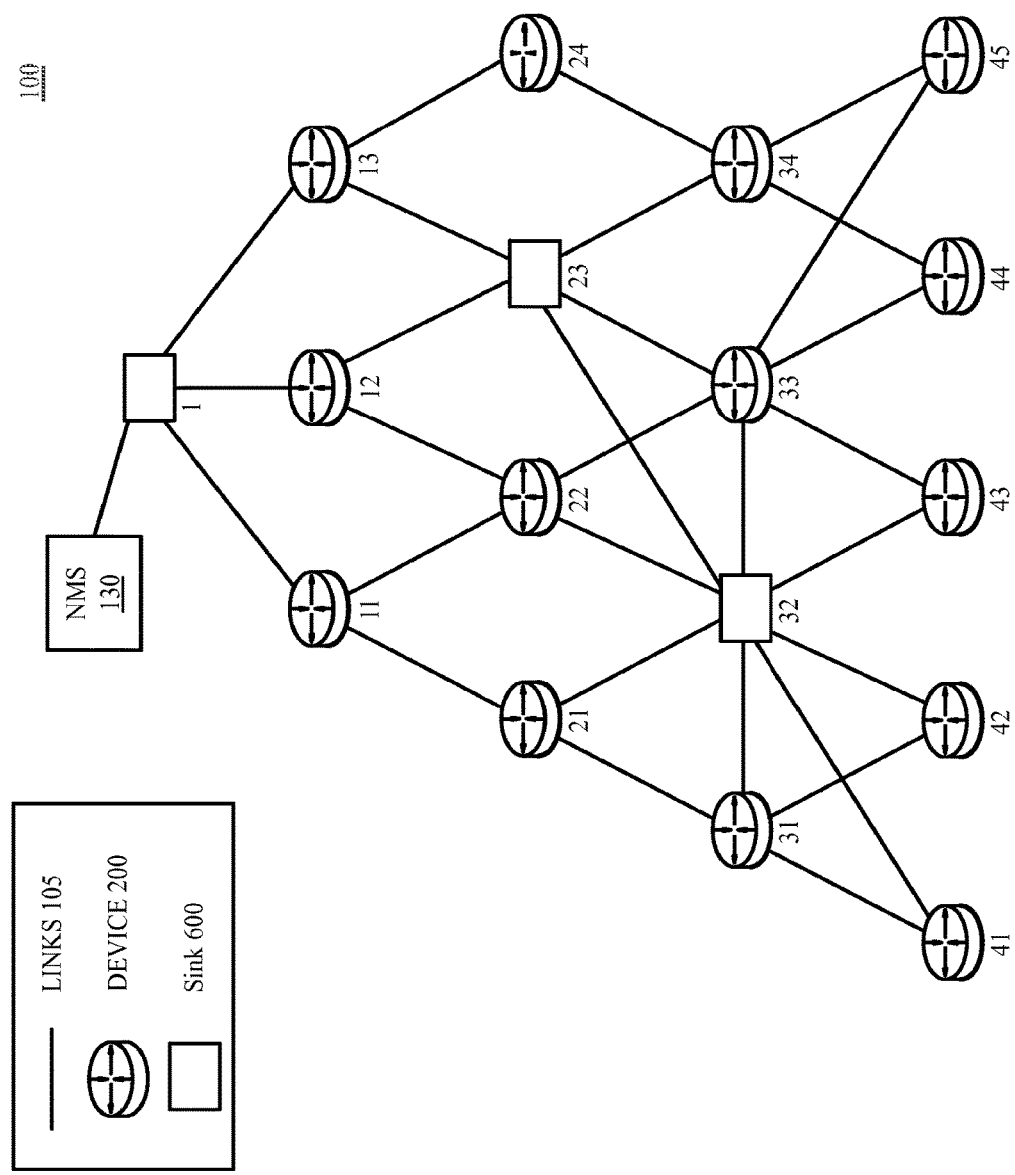
FIG. 6 is a block diagram depicting an example communication network in accordance with certain alternative example embodiments.

Although the above-described techniques have been illustrated with respect to an LLN in which network traffic transits through the root/LBR, it should be noted that the techniques described herein may be generally applied to any network, particularly to any constrained network. For example, as shown in FIG. 6, a network 100 that does not have a central node through which all traffic is piped (for example, like the LBR of an LLN), may have one or more sinks 600 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A method, comprising:
   in a low power and lossy network (LLN) comprising a plurality of nodes, calculating a rate of change for parents of a node, including backup parents of the node, the rate of change being a ratio of a number of times a parent node for the node changes from one parent node to another parent node and a total number of observations of the node;
   when the calculated rate of change for parents of the node exceeds a predetermined positive value, overriding a local next-hop algorithm for the node by selecting a particular parent node for the node;
   determining that variability in backup parent node designations for the node exceeds a predetermined threshold; and
   instructing the node to select specified backup parent nodes in response to determining that the variability in backup parent node designations for the node exceeds the predetermined threshold.

2. The method of claim 1, wherein the selection of the particular parent node is permanent.

3. The method of claim 1, wherein the selection of the particular parent node is for a predetermined duration of time after which the node returns to executing the local next-hop algorithm to select parent nodes.

4. The method of claim 1, further comprising calculating a parent preference for the node, the parent preference being a proportion of instances in which the node's most frequent parent is observed for the node and a total number of observations of the node, wherein calculating the rate of change for parents of the node and calculating the parent preference for the node occur upon receipt of messages from the node comprising parent information for the node.

5. The method of claim 1, further comprising comparing traffic levels across the nodes of a directed acyclic graph against a service level requirement to determine deviation from the service level requirement before overriding the local next-hop algorithm.

6. The method of claim 1, wherein overriding the local next-hop algorithm for the node comprises communicating routing information to the node, the routing information identifying a specific node so that a preferred parent is selected as the parent node.

7. The method of claim 6, wherein the particular parent node is selected to increase stability of the LLN.

8. The method of claim 1, further comprising performing a global override of a best next-hop selection used by nodes in the LLN including the node based on a determination of a degree of flappiness experienced by the nodes in the LLN.

9. The method of claim 1, wherein the particular parent node is selected based on the particular parent node having a minimal transmission delay compared to other potential parent nodes.

10. The method of claim 1, further comprising instructing the node to remain in communication with the particular parent node.

11. An apparatus, comprising:
   one or more network interfaces to communicate with a low power and lossy network (LLN);
   a processor coupled to the network interfaces and adapted to execute one or more processes; and
   a memory configured to store a process executable by the processor, the process when executed by the processor operable to:
      determine a rate of change for parents of a node, including backup parents of the node, the rate of change being a ratio of a number of times a parent node for the node changes from one parent node to another parent node and a total number of observations of the node, the determination being made at a root node of a directed acyclic graph of nodes that comprises the node;
      determine that variability in backup parent node designations for the node exceeds a positive predetermined threshold based on the determined rate of change for parents of the node;
instruct the node to select specified backup parent nodes in response to determining that the variability in backup parent node designations for the node exceeds the predetermined threshold.

12. The apparatus of claim 11, wherein the process when executed is further operable to determine a parent preference for the node, the parent preference being a proportion of instances in which the node's most frequent parent is observed for the node and a total number of observations of the node, wherein the process when executed is further operable to determine the rate of change for parents of the node and to determine the parent preference for the node based upon receipt of messages from the node comprising parent information for the node.

13. The apparatus of claim 11, wherein the process when executed is further operable to override a local next-hop algorithm for the node by communicating routing information to the node, the routing information identifying a specific node so that a preferred parent is selected as the parent node.

14. The apparatus of claim 11, wherein the process when executed is further operable to compare traffic levels across the nodes of the directed acyclic graph against a service level requirement to determine deviation from the service level requirement before overriding a local next-hop algorithm.

15. The apparatus of claim 11, wherein the process when executed is further operable to perform a global override of a best next-hop selection used by nodes in the LLN including the node.

16. The apparatus of claim 11, wherein the parent node is selected to increase stability of the LLN.

17. The apparatus of claim 11, wherein the selection of the parent node is permanent.

18. The apparatus of claim 11, wherein the selection of the parent node is for a predetermined duration of time after which the node returns to executing a local next-hop algorithm to select parent nodes.

19. The apparatus of claim 11, wherein calculating the rate of change for parents of the node and calculating the parent preference for the node occur upon receipt of messages from the node comprising parent information for the node.

20. The apparatus of claim 11, wherein calculating a rate of change for parents of the node and calculating a parent preference for the node occur at the root node of the directed acyclic graph of nodes that comprise the node.

21. A tangible, non-transitory, computer-readable media having software encoded thereon, the software when executed by a processor operable to:
in a low power and lossy network comprising a plurality of nodes, determine a rate of change for parents of a node, the rate of change being a ratio of a number of times a parent node for the node changes from one parent node to another parent node and a total number of observations of the node;
determine a parent preference for the node, the parent preference being a proportion of instances in which the node's most frequent parent is observed for the node and a total number of observations of the node;
when the determined rate of change for parents of the node exceeds a positive predetermined value, override a local next-hop algorithm for the node by selecting a parent node for the node; and
perform a global override of a best next-hop selection used by nodes in the LLN including the node based on a determination of a degree of flappiness experienced by the nodes in the LLN.

22. The computer-readable media of claim 21, wherein the selection of the parent node is permanent.

23. The computer-readable media of claim 21, wherein the selection of the parent node is for a predetermined duration of time after which the node returns to executing the local next-hop algorithm to select parent nodes.

24. The computer-readable media of claim 21, wherein calculating the rate of change for parents of the node and calculating the parent preference for the node occur upon receipt of messages from the node comprising parent information for the node.

25. The computer-readable media of claim 21, wherein calculating the rate of change for parents of the node and calculating the parent preference for the node occur at a root node of a directed acyclic graph of nodes that comprise the node.

26. The computer-readable media of claim 25, further comprising comparing traffic levels across the nodes of the directed acyclic graph against a service level requirement to determine deviation from the service level requirement before overriding the local next-hop algorithm.

27. The computer-readable media of claim 25, further comprising:
examining the node in the directed acyclic graph of nodes to determine that variability in backup parent node designations for the node exceeds a predetermined threshold; and
instructing the node to select specified backup parent nodes in response to determining that the variability in backup parent node designations for the node exceeds the predetermined threshold.

28. The computer-readable media of claim 21, wherein overriding the local next-hop algorithm for the node comprises communicating routing information to the node, the routing information identifying a specific node so that a preferred parent is selected as the parent node.

29. The computer-readable media of claim 28, wherein the parent node is selected to increase stability of the LLN.

30. The computer-readable media of claim 21, further comprising performing a global override of a best next-hop selection used by nodes in the LLN including the node based on a determination of a degree of flappiness experienced by the nodes in the LLN.

31. The computer-readable media of claim 21, when a calculated preference for a particular parent node for the node exceeds a predetermined value, further comprising overriding the local next-hop algorithm for the node by selecting the particular parent node for the node and instructing the node to remain in communication with the particular parent node.

* * * * *